Figures 1, 2:
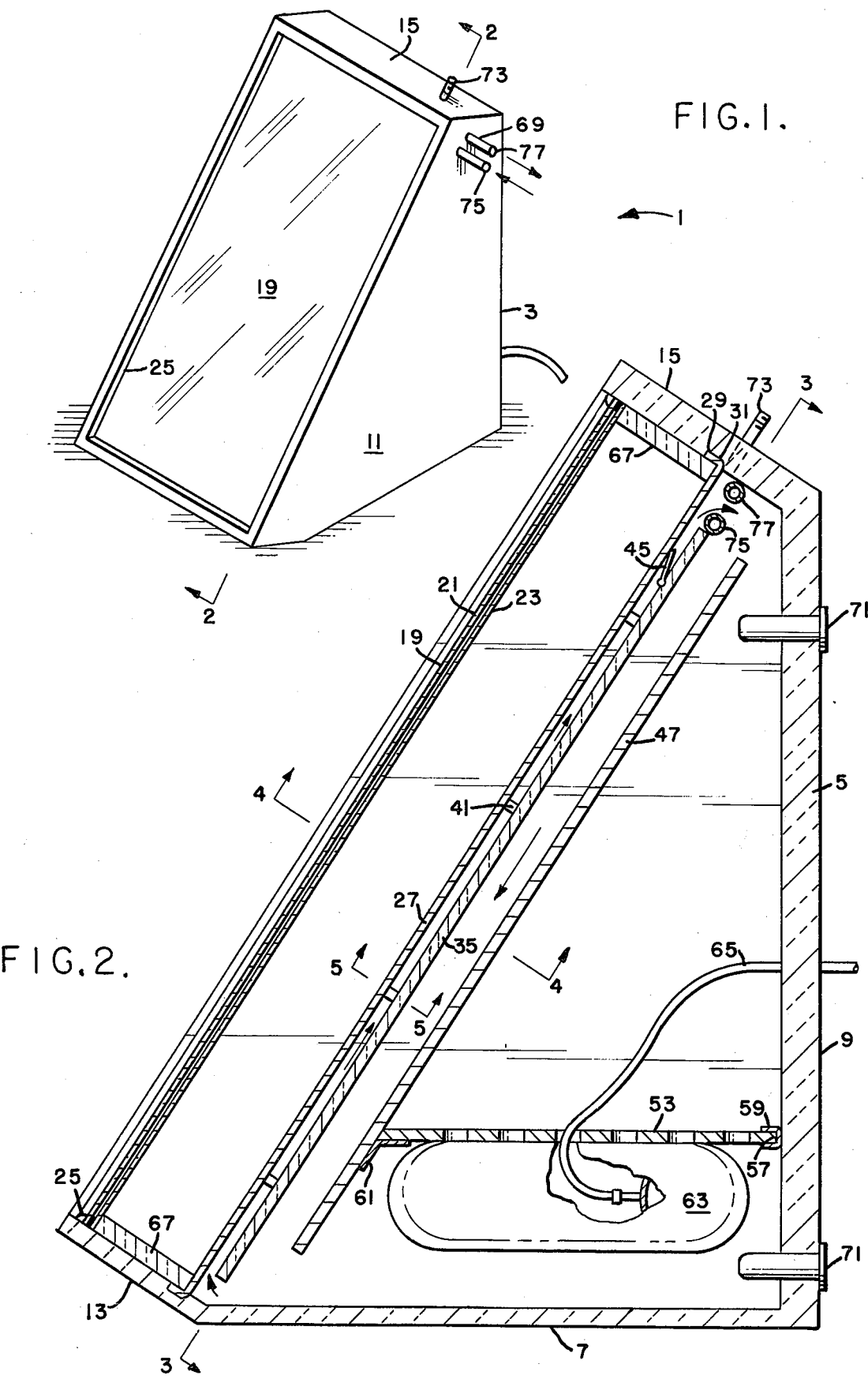

United States Patent [19]
Meier, Jr.

[11] 3,987,782
[45] Oct. 26, 1976

[54] SOLAR HEAT HOLDER

[76] Inventor: Herman Meier, Jr., Box 31, R.D., Coxsackie, N.Y. 12051

[22] Filed: June 16, 1975

[21] Appl. No.: 587,419

[52] U.S. Cl. .............................................. 126/271
[51] Int. Cl.² ........................................... F24J 3/02
[58] Field of Search .............. 126/270, 271; 60/641; 237/1 A, 66

[56] References Cited
UNITED STATES PATENTS

| | | | |
|---|---|---|---|
| 1,158,175 | 10/1915 | Cherrier | 126/270 |
| 2,122,821 | 7/1938 | Mohr | 126/271 |
| 2,358,476 | 9/1944 | Routh et al. | 126/271 |
| 2,553,073 | 5/1951 | Barnett | 126/271 |
| 2,553,302 | 5/1951 | Cornwell | 126/271 |
| 3,834,355 | 9/1974 | Arant | 237/66 |

FOREIGN PATENTS OR APPLICATIONS

257,348  10/1948  Switzerland ......................... 126/271

Primary Examiner—Kenneth W. Sprague
Assistant Examiner—James C. Yeung

[57] ABSTRACT

Discloses a closed-system, solar heat holder for thin-film heating of heat-transfer fluid in a tank. Solar energy, passing through an insulated glass cover, is trapped between the glass cover and an absorbing surface to heat the absorbing surface and thereby a thin film of heat-transfer fluid passing between the thin-film spacing provided by the absorbing surface and a parallel-disposed, insulated baffle with a bimetallic thermostat valve controlling the passage therethrough of such heat-transfer fluid which, when heated, in turn gives up heat to fluid flowing through a heat exchanger thereby cooling such heated heat-transfer fluid. Another insulated baffle is disposed parallel to the first baffle and the cooled heat-transfer fluid moves downwardly between the baffles to the bottom of the tank. A pneumatic container in the tank contracts to relieve the tank of pressure resulting from the heating and expansion of the heat-transfer fluid. Mirrors disposed between the glass cover and absorbing surface reflect solar energy onto the absorbing surface during variations of solar energy incidence when the sun's rays are not perpendicular to the glass cover.

1 Claim, 5 Drawing Figures

SOLAR HEAT HOLDER

This invention relates to a closed-system, solar heat holder for thin-film heating of heat-transfer fluid in a tank and which heated heat-transfer fluid, in turn, can be utilized to heat fluid, such as water, flowing through a heat exchanger that is used for domestic purposes or heating a home.

The problem in the art to which this invention appertains is the need for a simple, inexpensive, reliable and trouble-free, closed-system, solar heat holder for thin-film heating of heat-transfer fluid in a tank, and which heated heat-transfer fluid, in turn, can be utilized to heat fluid, such as water, flowing through a heat exchanger that is used for domestic purposes or heating a home. The object of this invention, accordingly, is to contribute to the solution of the problem in the art by providing such a solar heat holder.

Figure 3:
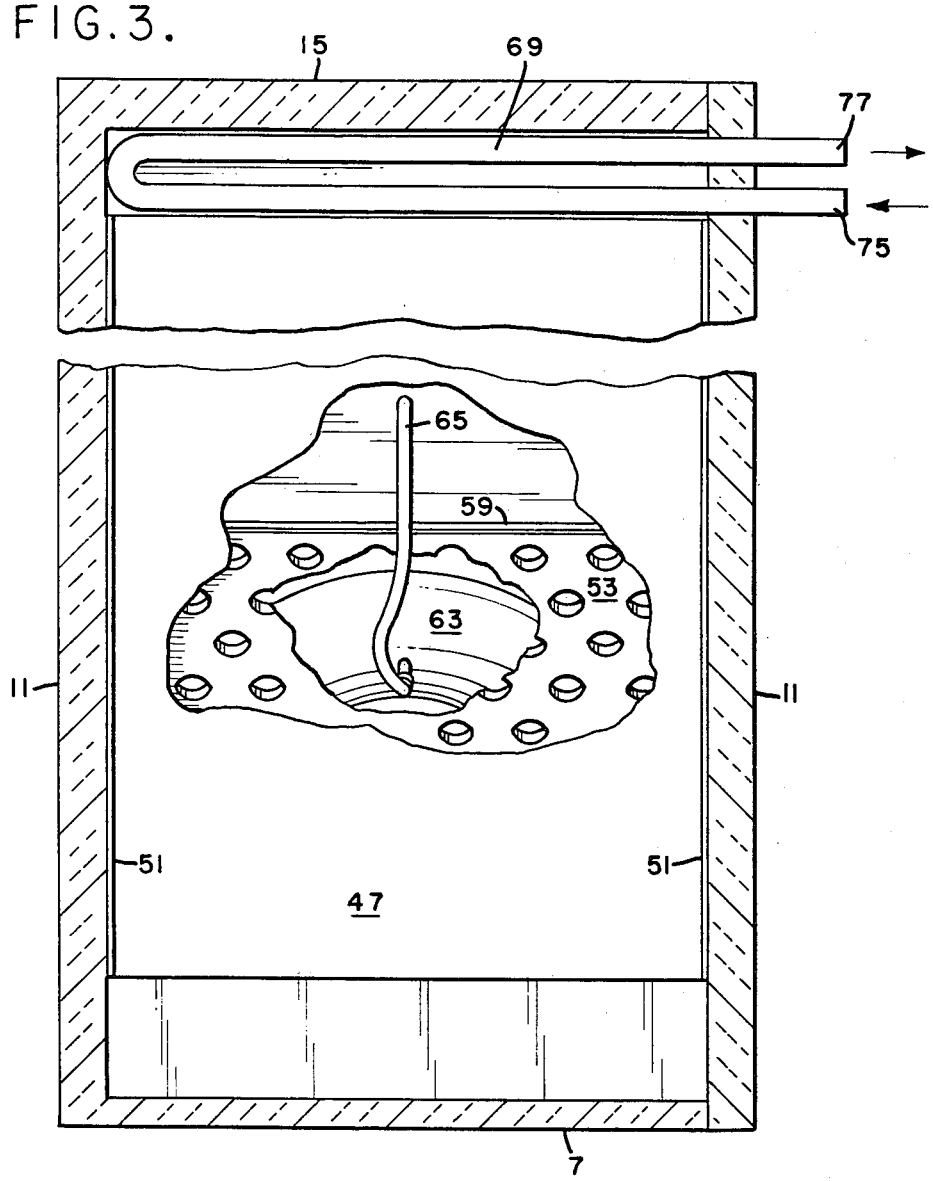
Figure 4:
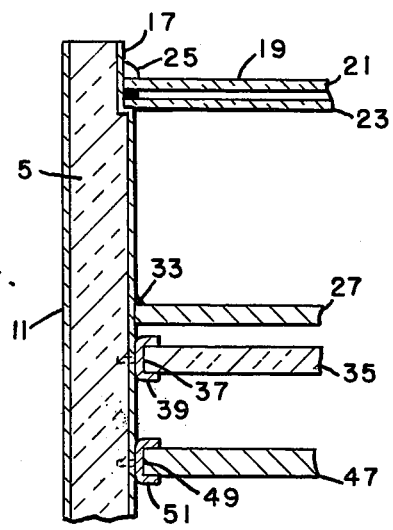
Figure 5:
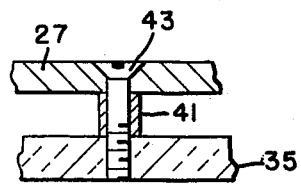

This object and other objects of the invention should be discerned and appreciated by reference to the detailed specification taken in conjunction with the drawings, wherein like reference numerals refer to similar parts throughout the several views, in which:

FIG. 1 is a perspective view of the solar heat holder;
FIG. 2 is a sectional view taken in the direction of the arrows 2 — 2 in FIG. 1;
FIG. 3 is a sectional view taken in the direction of the arrows 3 — 3 in FIG. 2;
FIG. 4 is a sectional view taken in the direction of the arrows 4 — 4 in FIG. 2; and
FIG. 5 is a sectional view taken in the direction of the arrows 5 — 5 in FIG. 2.

To facilitate the understanding of the invention, a nomenclature list is hereby provided:

1) generally refers to the invention;
3) tank;
5) insulation;
7) flat bottom;
9) rear wall;
11) sidewall;
13) lower wall;
15) upper wall;
17) shoulder portion;
19) glass cover;
21) glass plate;
23) glass plate;
25) glazing compound;
27) absorbing surface;
29) end portion;
31) recess;
33) brazing;
35) baffle;
37) lateral edge;
39) channel member;
41) spacer;
43) screw;
45) thermostat valve;
47) baffle;
49) lateral edge;
51) channel member;
53) bracket member;
55) hole;
57) lateral edge;
59) channel member;
61) angle;
63) pneumatic container;
65) hose;
67) mirror;
69) heat exchanger;
71) well;
73) filler and vent;
75) inlet;
77) outlet.

In FIG. 1 of the drawings, reference numeral 1 generally refers to the invention. A trough-shaped, double-walled, water-tight, metal tank 3, sandwiching therebetween suitable insulation 5, has a flat bottom, upstanding rear wall 9, sidewalls 11, a lower wall 13 projecting from bottom 7 and an upper wall 15 projecting from rear wall 9, as shown. It should be noted that metal tank 3 is double-walled throughout, but that such feature is shown only in FIG. 4.

Shoulder portions 17, formed in sidewalls 11, receive in mounting relationship a transparent, insulated glass cover 19 composed of a pair of spaced-apart glass plates 21 and 23 held in place by suitable glazing compound 25.

Radiant-energy absorbing surface 27, disposed parallel to cover 19, has upstanding end portions 29 received in recesses 31, and suitably sealed, formed in lower and upper walls 13 and 15, respectively, and joined to sidewalls 11 such as by brazing 33. Absorbing surface 27 preferably is blackened metal plate such as copper.

An insulated baffle 35, of marine plywood, impervious to water, and disposed parallel to absorbing surface 27, has its lateral edges 37 received in fixed mounting relationship within U-shaped channel members 39 suitably fixed, such as by screws, to sidewalls 11. Spacers 41, carried by screws 43 disposed through copper plate 27 and engaged with baffle 35, maintain an approximate 1/16-th inch spacing between copper plate 27 and baffle 35. It should be noted that the spacing depicted in the drawings between copper plate 27 and baffle 35 is shown exaggerated for purposes of clarity.

Shown in its closed position in FIG. 2 is a bimetallic thermostat valve 45 whose one end is suitably fixed to baffle 35 and whose other operative end engages copper plate 27. As would be viewed if shown in FIG. 1, valve 45 extends the full width of copper plate absorbing surface 27.

A second baffle 47, similar to baffle 35, disposed parallel to baffle 35, has its lateral edges 49 received in fixed mounting relationship within U-shaped channel members 51 suitably fixed, such as by screws, to sidewalls 11.

A perforated bracket member 53, transversely disposed relative to rear wall 9 and having holes 55 formed therethrough, has its adjacent lateral edges 57 received in fixed mounting relationship within U-shaped channel members 59 suitably fixed, such as by screws, to rear wall 9 and sidewalls 11. An angle 61 is suitably fixed to baffle 47 and bracket member 53 to join same.

A suitable, pressure-relieving, pneumatic container 63, disposed beneath bracket member 51, as shown, has a pressure hose 65, disposed in suitable sealed relationship through rear wall 9, which communicates with elastic container 63 to regulate the amount of air under pressure in pneumatic elastic container 63 that can be maintained, released, or introduced from an external supply (not shown).

Disposed between glass plate 23 and copper plate 27 are two reflecting surfaces 67, such as mirrors, that extend the full width of lower wall 13 and upper wall 15, and are suitably fixed thereto.

A heat exchanger 69 of U-shaped tubing, as shown, is suitably mounted in fixed relationship by sidewall 11 and is suitably sealed in water-tight relationship therewith.

Interiorly projecting wells 71 are suitably fixed to rear wall 9. Such wells 71 are adapted to mount and receive therein suitable conventional sensing or control devices to monitor the temperature of the heat-transfer fluid in tank 3 and to control the flow of fluid through the heat exchanger 69 in cooperation with other conventional means (not shown) for such control.

Radiant energy from the sun travels in straight lines and passes through a medium such as air without heating it and through glass with minimal heating of such glass.

The solar heat holder 1 of this invention is appropriately disposed in use such that the maximum solar energy will impinge upon glass cover 19 with the sun's rays being perpendicular to glass cover 19 and hence perpendicular to copper plate absorbing surface 27. The filler and vent 73 is suitably utilized to fill tank 3 with a sufficient quantity of heat-transfer fluid such as water containing ethylene glycol to prevent freezing.

For reasons of the variations in incidence of the sun's rays from early morning to late afternoon, mirrors 67 are employed to reflect the sun's rays during such variations onto absorbing surface 27 when the sun's rays are not perpendicular to glass cover 19 so that maximal amounts possible of such radiant heat energy will impinge upon absorbing surface 27.

The radiant energy passing through insulated glass cover 19 and the air space between glass cover 19 and absorbing surface 27 is trapped therebetween and heats absorbing surface 27 and thereby the thin film of heat-transfer fluid between absorbing surface 27 and baffle 35. It should be noted from prior discussion that the air space between insulated glass cover 19 and absorbing surface 27, as well as the insulated glass cover 19 itself, protects absorbing surface 27 from atmospheric cooling. Solar heating of a thin film of heat-transfer fluid in a solar heat holder appears to be the most efficient utilization thereof in today's technology. Heating of such thin film of heat-transfer fluid causes its temperature to rise appreciably along with expansion of its volume. Such heating of the heat-transfer fluid by absorbing surface 27 is by means of heat transference known as convection. The heated heat-transfer fluid will rise between absorbing surface 27 and baffle 35 with the closed bimetallic thermostat valve 45 opening by its operative end being disposed upon baffle 35. So long as the heated heat-transfer fluid passing over valve 45 is of a certain temperature, valve 45 will remain open. Otherwise, if such heat-transfer fluid is less than such certain temperature, valve 45 will close.

As such heat-transfer fluid is heated, it rises and passes over heat exchanger 69 and into tank 3. After the solar heat holder 1 of this invention has been in operation, all the heat-transfer fluid in tank 3 will have become heated. Since the system utilized herein is a closed system, such heating of the heat-transfer fluid results in the exertion of pressure therefrom because minimal room for fluid expansion is provided for in tank 3. Were it not for the pressure-relieving, pneumatic container 63 incorporated in this closed system, tank 3 would eventually burst from the pressure exerted by such heat-transfer fluid. Such spatial expansion of the heat-transfer fluid and the resulting pressure same exerts in this closed system is accommodated and relieved by the elastic container 63 which contracts from such pressure exerted by such heated and expanded heat-transfer fluid.

The fluid to be heated in heat exchanger 69 can be water for domestic purposes or for heating a home, etc. Such water to be heated in heat exchanger 69 flows therethrough in the direction of the directional arrows indicated in FIGS. 1 and 3, i.e., through inlet 75 to and through outlet 77.

After the heat-transfer fluid in tank 3 has been heated, water is suitably flowed through heat exchanger 69 cooling the heat-transfer fluid in the immediate and proximate region of heat exchanger 69, with such heated heat-transfer fluid thereby giving up heat to the water flowing through heat exchanger 69. Such cooled and denser heat-transfer fluid moves downwardly between baffles 35 and 47 to the bottom of tank 3, as indicated by the directional arrow in FIG. 2, and sets up convection currents which cause the heated heat-transfer fluid in the region of tank 3 bounded by baffle 47, rear wall 9 and sidewalls 11 to move upwardly to heat exchanger 69. Such cooled and denser heat-transfer fluid which moves downwardly between baffles 35 and 47 to the bottom of tank 3 then moves upwardly between absorbing surface 27 and baffle 35 where it is reheated by the radiant energy from the sun.

From the description of the operation of the solar heat holder 1, it should be evident that baffle 35 insulates the thin film of heat-transfer fluid being heated between absorbing surface 27 and baffle 35 from the cooled heat-transfer fluid moving downwardly between insulated baffles 35 and 47, and, in turn, such cooled heat-transfer fluid is insulated by baffle 47 from the heated heat-transfer fluid remaining in the region of tank 3 bounded by baffle 47, rear wall 9 and sidewalls 11, affording thereby a smooth and efficient movement of the heat-transfer fluid by convection currents in this closed system.

Having thusly described my invention, I claim:

1. A closed-system, solar heat holder for thin-film solar heating of heat-transfer fluid contained therein; said solar heat holder comprising a tank, blackened copper plate absorbing surface, two insulated baffles, pneumatic container, heat exchanger means, transparent cover means, bimetalic thermostat valve, mirrors and bracket means; said tank being trough-shaped, of double-walled metal, water-tight and sandwiching therebetween insulation, and containing said heat-transfer fluid; said tank carrying said absorbing surface, baffles, heat exchanger means, transparent cover means, mirrors and bracket means; said baffles being parallel to each other and to said absorbing surface; said transparent cover means being insulated, comprising a pair of spaced-apart glass plates parallel to said absorbing surface, and thereby allowing solar energy to pass therethrough and to trap same between said transparent cover means and said absorbing surface to heat said absorbing surface and thereby said heat-transfer fluid; said absorbing surface and one of said baffles providing a thin-film spacing for said heat-transfer fluid therebetween; said bimetallic thermostat valve having one end fixed to one of said baffles and its other operative end engaging, in its closed position, said absorbing surface to control movement of said heat-transfer fluid between said absorbing surface and said baffle to which said one end of said bimetallic thermostat valve is fixed; said heat exchanger being adapted for flowing of fluid therethrough, and said thin-film, heated heat-transfer fluid being cooled upon giving up heat to said fluid in said heat exchanger, and said baffles allowing movement therebetween of said cooled heat-transfer fluid; said pneumatic container relieving internal pressure exerted by said heated heat-transfer fluid; said mirrors being disposed between said transparent cover means and said absorbing surface to reflect solar energy onto said absorbing surface during variations of incidence of such solar energy when the sun's rays are not perpendicular to said transparent cover means and hence absorbing surface; and said bracket means having holes formed therethrough and being joined to one of said baffles.

* * * * *